(12) United States Patent
Giduturi (10) Patent No.: US 11,762,443 B2
(45) Date of Patent: *Sep. 19, 2023

(54) POWER MANAGEMENT FOR MEMORY DEVICE

(71) Applicant: Micron Technology, Inc., Boise, ID (US)

(72) Inventor: Hari Giduturi, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,079

(22) Filed: Apr. 20, 2022

(65) Prior Publication Data

US 2022/0326753 A1 Oct. 13, 2022

Related U.S. Application Data

(63) Continuation of application No. 16/733,911, filed on Jan. 3, 2020, now Pat. No. 11,314,301.

(51) Int. Cl.
*G06F 1/26* (2006.01)
*G06F 13/16* (2006.01)

(52) U.S. Cl.
CPC .......... *G06F 1/266* (2013.01); *G06F 13/1668* (2013.01)

(58) Field of Classification Search
CPC .............................. G06F 1/266; G06F 13/1668
See application file for complete search history.

(56) References Cited

U.S. PATENT DOCUMENTS

| | | | | |
|---|---|---|---|---|
| 10,163,977 | B1* | 12/2018 | Fantini | C01B 19/007 |
| 2012/0084483 | A1* | 4/2012 | Sanjive | G06F 13/14 |
| | | | | 710/305 |
| 2019/0034106 | A1* | 1/2019 | Shin | G06F 13/1668 |
| 2019/0340142 | A1* | 11/2019 | Patel | G11C 5/14 |
| 2019/0385645 | A1* | 12/2019 | Park | G11C 29/021 |
| 2020/0065029 | A1* | 2/2020 | Kim | G06F 3/0619 |

* cited by examiner

*Primary Examiner* — Nimesh G Patel
(74) *Attorney, Agent, or Firm* — Holland & Hart LLP (57) ABSTRACT

Methods, systems, and devices for power management of a memory device are described. An apparatus may include a substrate and an input/output (I/O) interface and memory device coupled with the substrate. The I/O interface may communicate with a host device and the memory device may store data associated with the host device. The apparatus may include a power management component for providing one or more supply voltages to the memory device. The power management component may receive input voltages associated with the substrate and provide the supply voltages to the memory device based on the input voltages. The power management component may include a first portion integrated with the memory device and a second portion coupled with the substrate. The first portion may include control circuitry for the power management component and the second portion may include passive components for the power management component.

20 Claims, 7 Drawing Sheets

POWER MANAGEMENT FOR MEMORY DEVICE

CROSS REFERENCE

The present Application for Patent is a continuation of U.S. patent application Ser. No. 16/733,911 by Giduturi, entitled "POWER MANAGEMENT FOR MEMORY DEVICE," filed Jan. 3, 2020, assigned to the assignee hereof, and is expressly incorporated by reference in its entirety herein.

BACKGROUND

The following relates generally to one or more memory systems and more specifically to power management for a memory device.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile.

Improving memory devices, generally, may include increasing memory cell density, decreasing area usage, increasing read/write speeds, increasing reliability, increasing data retention, reducing power consumption, decreasing stress on a memory cell, or reducing manufacturing costs, among other metrics.

DETAILED DESCRIPTION

For some applications of the memory system (e.g., mobile device applications, vehicle applications, device-specific applications), there may be a defined size of the substrate. For example, if the memory system is to be utilized within a mobile device, the substrate may have a defined area of 11.5 millimeters by 13 millimeters. As a result of the defined substrate size, decreasing an amount of area occupied by components within the memory system may enable additional functionality or storage to be added to the memory system. In some cases, a power management component for a memory device may be distinct from the memory device. That is, the power management component may be coupled with a portion of a substrate of a memory system and the memory device may be coupled with a separate portion of the substrate. To decrease a total area occupied by the power management component, a first portion of the power management component may be formed on the memory device rather than on the substrate and a second portion of the power management component may be formed on the substrate. By decreasing the total area of the substrate occupied by the power management component, additional functionality or storage may be added to the memory system.

The first portion of the power management component may be coupled with the memory device and the second portion of the power management component may be coupled with the substrate. By coupling the first portion of the power management component with the memory device, the area of the substrate occupied by the power management component and the memory device may decrease. In some cases, the first portion of the power management component may include one or more active components (e.g., diodes, switches, control circuitry) formed on the memory device and the second portion of the power management component may include one or more passive components (e.g., resistors, capacitors, inductors, transformers) formed on the substrate.

Features of the disclosure are initially described in the context of systems and memory cells as described with reference to FIGS. 1 and 2. Features of the disclosure are described in the context memory systems as described with reference to FIGS. 3-5. These and other features of the disclosure are further illustrated by and described with reference to an apparatus diagram and a flowchart that relate to power management for a memory device as described with references to FIGS. 6-7.

Figure 1:
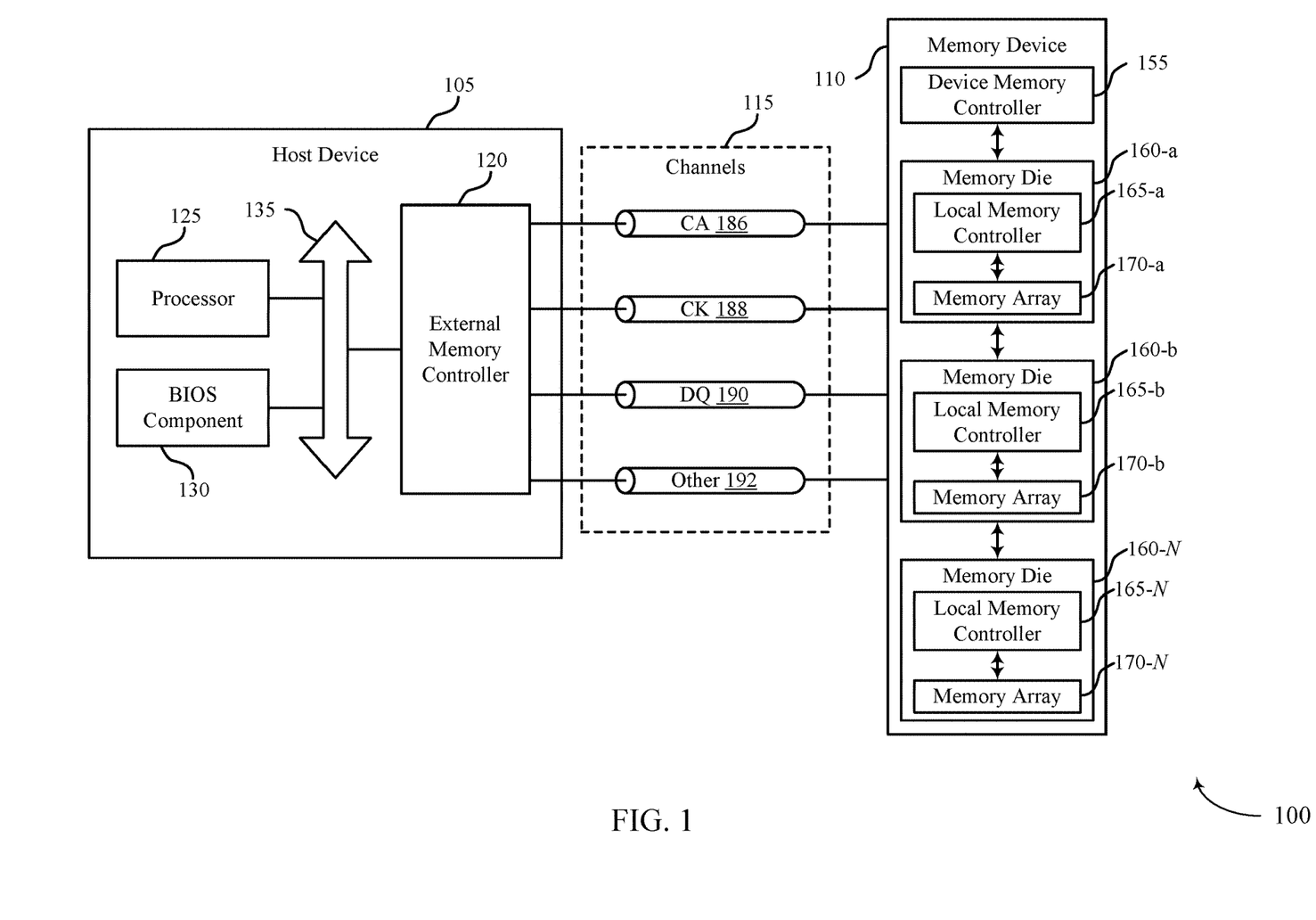
FIG. 1 illustrates an example of a system that supports power management for a memory device in accordance with examples as disclosed herein.

FIG. 1 illustrates an example of a system 100 that utilizes one or more memory devices in accordance with examples as disclosed herein. The system 100 may include a host device 105, a memory device 110, and a plurality of channels 115 coupling the host device 105 with the memory device 110. The system 100 may include one or more memory devices, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices 105. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

A memory system may include one or more components formed on a substrate. The memory system formed on the substrate may be referred to as a package and may be a universal flash storage (UFS) memory system. Some memory systems may include one or more memory devices 110 of different types. For example, a memory system may include a first memory device with a first type of memory cells (e.g., memory cells within a three dimensional cross point memory array) and a second memory device with a second type of memory cells (e.g., memory cells within a not AND (NAND) memory array). Each of the memory devices 110 may utilize one or more supply voltages to power components within the memory device. In some cases, the memory devices 110 may have unique power requirements. For example, the first memory device may require a first set of supply voltages while the second memory device may require a second set of supply voltages. If the supply voltages required by a memory device are different than a set of input voltages (e.g., that are associated with the substrate), the memory device may receive the one or more supply voltages from a power management component. The power management component may receive input voltages and generate the supply voltages for the memory device.

The memory device 110 may be formed on and coupled with a substrate. The memory device 110 may utilize one or more supply voltages to power components (e.g., device memory controller 155, memory dies 160, local memory controllers 165, memory arrays 170) within the memory device 110. The memory device 110 may receive the one or more supply voltages from a power management component also formed on and coupled with the substrate. The power management component may receive one or more input voltages and generate the supply voltages for the memory device 110. In some instances, at least one of the supply voltages may be different than the input voltages. In some cases, the power management component may be distinct from the memory device 110. That is, the power management component may occupy a portion of the substrate and the memory device 110 may occupy a separate portion of the substrate. Decreasing an amount of area of the substrate occupied by the power management component and the memory device 110 may be desirable. In some cases, integrating a portion of the power management component with the memory device may decrease the area occupied by the power management component and the memory device 110.

To integrate a portion of the power management component with the memory device 110, a portion of the power management component may occupy a same area of the substrate as is occupied by the memory device 110. Thus, a first portion of the power management component may be coupled with the memory device 110 and a second portion of the power management component may be coupled with the substrate. By coupling the first portion of the power management component with the memory device 110, the area of the substrate occupied by the power management component and the memory device 110 may decrease (e.g., by the area of the first portion of the power management component). In some cases, the first portion of the power management component may include one or more active components (e.g., diodes, switches, control circuitry) formed on the memory device 110 and the second portion of the power management component may include one or more passive components (e.g., resistors, capacitors, inductors, transformers) formed on the substrate. In some examples, the first portion of the power management component may be formed on one of the memory dies 160 of the memory device 110. For example, the first portion of the power management component may be formed on memory die 160-a. Here, each of the other memory dies 160 (e.g., memory dies 160-b through 160-N) may be coupled with an output of the first portion of the power management component formed on the memory die 160-a.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 by an input/output (I/O) interface including one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the channels 115 may include one or more data channels 190. The data channels 190 may be operable to communicate one or more of data or control information between the host device 105 and the memory device 110. For example, the data channels 190 may communicate information (e.g., bi-directional) to be written to the memory device 110 or information read from the memory device 110.

Figure 2:
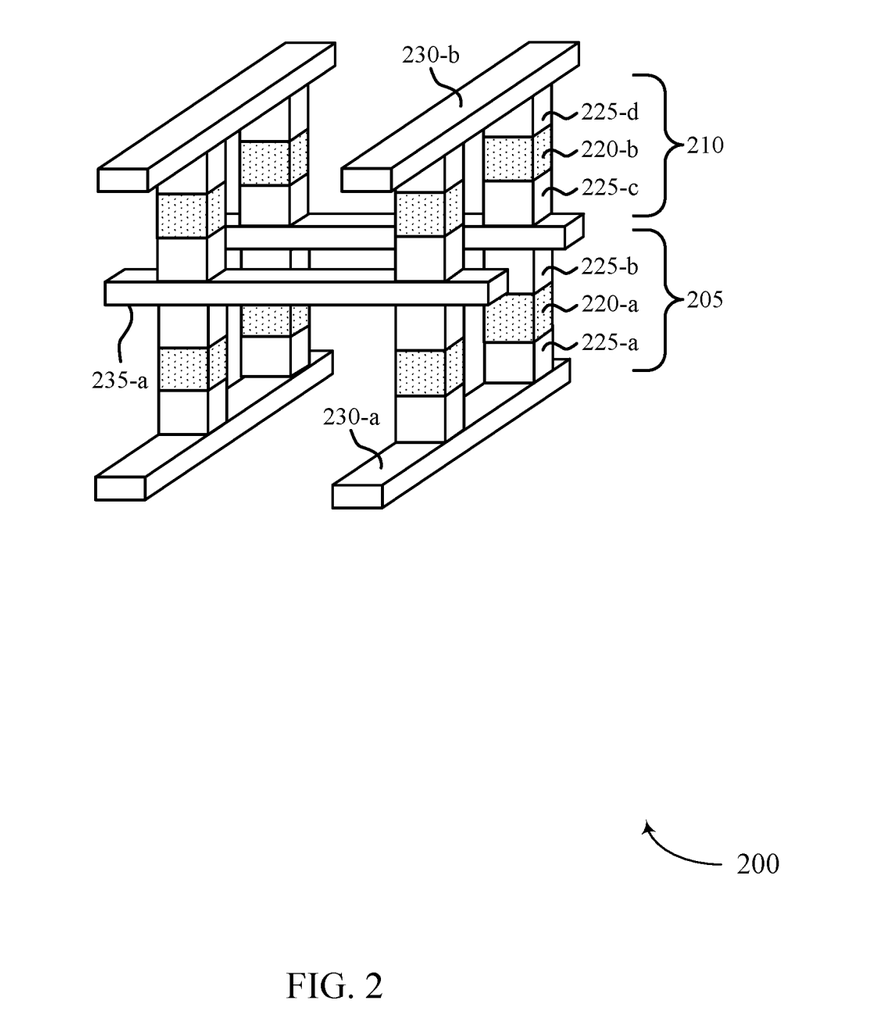
FIG. 2 illustrates an example of a memory array that supports power management for a memory device in accordance with examples as disclosed herein.

FIG. 2 illustrates an example of a memory array 200 in accordance with examples as disclosed herein. Memory array 200 may be an example of portions of the memory arrays or memory dies described with reference to FIG. 1. The memory array 200 may include a first deck 205 of memory cells that is positioned above a substrate and second deck 210 of memory cells on top of the first array or deck 205. Though the example of memory array 200 includes two decks 205, 210, the memory array 200 may include any quantity of decks (e.g., one, two, three, four, five, six, seven, eight).

Memory array 200 may also include access lines such as a row line 230-a, a row line 230-b, and a column line 235-a. The access lines may be arranged in a pattern, such as a grid-like pattern. Access lines may be formed of one or more conductive materials. In some examples, row lines 230 may be referred to as word lines. In some examples, column lines 235 may be referred to as digit lines or bit lines. References to access lines, row lines, column lines, word lines, digit lines, or bit lines, or their analogues, are interchangeable without loss of understanding or operation. Memory cells may be positioned at intersections of the row lines 230 and the column lines 235.

Operations such as reading and writing may be performed on the memory cells by activating or selecting access lines such as one or more of a row line 230 or a column line 235. By biasing a row line 230 and a column line 235 (e.g., applying a voltage to the row line 230 or the column line 235), a single memory cell may be accessed at their intersection. The intersection of a row line 230 and a column line 235 in either a two-dimensional or three-dimensional configuration may be referred to as an address of a memory cell. An access line may be a conductive line coupled with a memory cell and may be used to perform access operations on the memory cell.

One or more memory cells of the first deck 205 and the second deck 210 may include one or more chalcogenide materials in a pillar between access lines. For example, a single stack between access lines may include one or more of a first electrode, a first chalcogenide material (e.g., selector component), a second electrode, a second chalcogenide material (e.g., storage element), or a third electrode. Although some elements included in FIG. 2 are labeled with a numeric indicator, other corresponding elements are not labeled, although they are the same or would be understood to be similar, in an effort to increase visibility and clarity of the depicted features.

One or more memory cells of the first deck 205 may include one or more of an electrode 225-a, a storage element 220-a, or an electrode 225-b. One or more memory cells of the second deck 210 may include an electrode 225-c, a storage element 220-b, and an electrode 225-d. The storage elements 220 may be examples of a chalcogenide material, such as a phase change storage element or a self-selecting storage element. The memory cells of the first deck 205 and second deck 210 may, in some examples, have common conductive lines such that corresponding memory cells of one or more decks 205 and one or more decks 210 may share column lines 235 or row lines 230. For example, the first electrode 225-c of the second deck 210 and the second electrode 225-b of the first deck 205 may be coupled with column line 235-a such that the column line 235-a may be shared by vertically adjacent memory cells.

In some examples, the material of the storage element 220 may include a chalcogenide material or other alloy including selenium (Se), tellurium (Te), arsenic (As), antimony (Sb), carbon (C), germanium (Ge), silicon (Si), or indium (IN), or various combinations thereof. In some examples, a chalcogenide material having primarily selenium (Se), arsenic (As), and germanium (Ge) may be referred to as a SAG-alloy. In some examples, a SAG-alloy may also include silicon (Si) and such chalcogenide material may be referred to as SiSAG-alloy. In some examples, SAG-alloy may include silicon (Si) or indium (In) or a combination thereof and such chalcogenide materials may be referred to as SiSAG-alloy or InSAG-alloy, respectively, or a combination thereof. In some examples, the chalcogenide glass may include additional elements such as hydrogen (H), oxygen (O), nitrogen (N), chlorine (CO, or fluorine (F), each in atomic or molecular forms.

In some examples, the storage element 220 may be an example of a phase change memory cell. In such examples, the material used in the storage element 220 may be based on an alloy (such as the alloys listed above) and may be operated so as to undergo a phase change or change to different physical state during normal operation of the memory cell. For example, a phase change memory cell may have an amorphous state and a crystalline state. In some examples, such as for self-selecting memory cells, some or all of the set of logic states supported by the memory cells may be associated with an amorphous state of the chalcogenide material (e.g., the material in a single state may be operable to store different logic states).

The architecture of memory array 200 may be referred to as a cross-point architecture, in some examples, in which a memory cell is formed at a topological cross-point between a row line 230 and a column line 235. Such a cross-point architecture may offer relatively high-density data storage with lower production costs compared to other memory architectures. For example, the cross-point architecture may have memory cells with a reduced area and, resultantly, an increased memory cell density compared to other architectures. For example, the architecture may have a 4F2 memory cell area, where F is the smallest feature size, compared to other architectures with a 6F2 memory cell area, such as those with a three-terminal selector element. For example, DRAM may use a transistor, which is a three-terminal device, as the selector element for each memory cell and may have a larger memory cell area compared to the cross-point architecture. Alternatively, DRAM memory cells may include the cell selector elements underneath the memory cells.

While the example of FIG. 2 shows two memory decks, other configurations are possible. In some examples, a single memory deck of memory cells may be constructed above a substrate, which may be referred to as a two-dimensional memory. In some examples, two or more decks of memory cells may be configured in a similar manner in a three-dimensional cross point architecture. Further, in some cases, elements shown in or described with reference to FIG. 2 may be electrically coupled with one another as shown or described but rearranged physically (e.g., a storage element 220 and possibly a selection element 220 or electrode 225 may be electrically in series between a row line 230 and a column line 235 but need not be in a pillar or stack configuration).

The memory array 200 may be formed on and coupled with a substrate. The memory array 200 may utilize one or more supply voltages to power components (e.g., column lines 235, row lines 230) within the memory array 200. The memory array 200 may receive the one or more supply voltages from a power management component also formed on and coupled with the substrate. The power management component may receive one or more input voltages and generate the one or more supply voltages for the memory array 200 and at least one of the supply voltages may be different than the input voltages. In some cases, the power management component may be distinct from a memory device (e.g., including the memory array 200). That is, the power management component may occupy a portion of the substrate and the memory device may occupy a separate portion of the substrate. In some other cases, a portion of the power management component may occupy a same area of the substrate as is occupied by the memory device. Thus, a first portion of the power management component may be coupled with the memory device and a second portion of the power management component may be coupled with the substrate. The first portion of the power management component may include one or more active components (e.g., diodes, switches, control circuitry) formed on the memory array 200 and the second portion of the power management component may include one or more passive components (e.g., resistors, capacitors, inductors, transformers) formed on the substrate.

Figure 3:
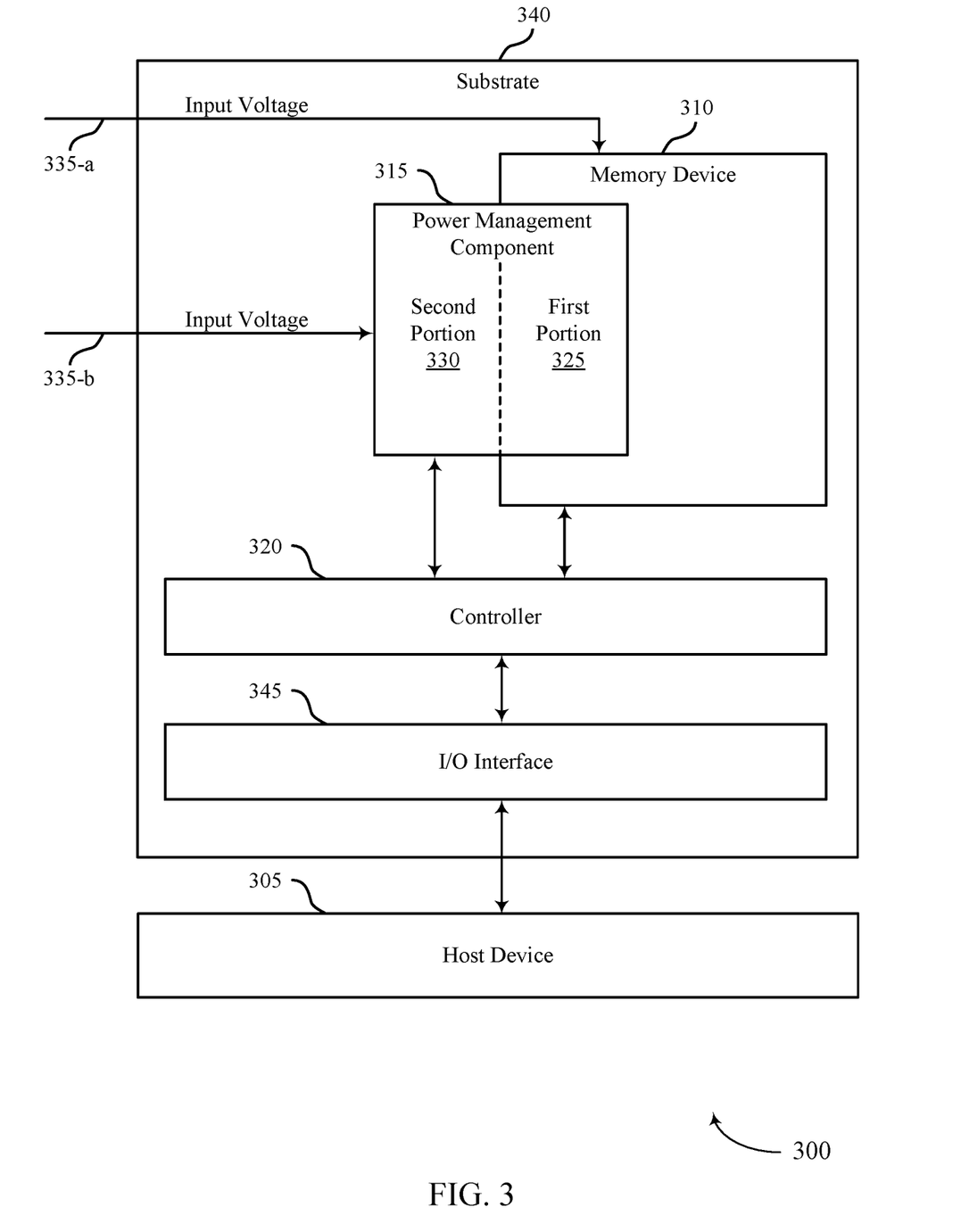
FIGS. 3 through 5 illustrate examples of one or more memory systems that support power management for a memory device in accordance with examples as disclosed herein.

FIG. 3 illustrates an example of a memory system 300 that supports power management for a memory device in accordance with examples as disclosed herein. Memory system 300 may include aspects of memory systems or memory arrays as described with reference to FIGS. 1 and 2. For example, host device 305 may be an example of host device 105 as described with reference to FIG. 1; memory device 310 may include aspects of memory device 110 as described with reference to FIG. 1 and memory array 200 as described with reference to FIG. 2; controller 320 may include aspects of device memory controller 155 or local memory controllers 165 as described with reference to FIG. 1; and I/O interface 345 may include aspects of channels 115 as described with reference to FIG. 1. The memory system 300 may further include a power management component 315, a substrate 340, and input voltages 335.

The memory device 310, controller 320, the I/O interface 345, and at least the second portion 330 of the power management component 315 may be formed on the substrate 340. That is, the memory device 310 may be formed over a first area of the substrate 340, the controller 320 may be formed over a second area of the substrate 340 (e.g., different than the first area), and the I/O interface 345 may be formed over a third area of the substrate 340 (e.g., different than the first and second areas). The second portion 330 of the power management component 315 may be formed over a fourth area of the substrate 340 that is different than the first, second, and third areas of the substrate 340. The memory device 310 may be coupled with the substrate 340 and in electronic communication with the controller 320 by a conductive path formed on the substrate 340. The controller 320 may in turn be in electronic communication with the I/O interface 345 by a conductive path formed on the substrate 340. The I/O interface 345 may be in electronic communication with the host device 305. For example, the I/O interface 345 may include one or more channels between the host device 305 and the controller 320 (e.g., as described with reference to FIG. 1). In some cases, the controller 320 may be formed on the memory device 310. Here, the controller 320 may be coupled with the memory device 310 and part of the memory device 310 (e.g., instead of formed on the substrate 340). For example, the controller 320 may be an example of the device memory controller 155 or the local memory controllers 165 as described with reference to FIG. 1.

The host device 305 may be in electronic communication with the memory device 310 by the controller 320 and the I/O interface 345. For example, the host device 305 may communicate access commands (e.g., a read command, a write command) and/or data with the I/O interface 345. The I/O interface 345 may propagate the access commands to the controller 320 which may, in turn, cause generate commands to cause the memory device 310 to execute the access command. For example, the host device 305 may communicate a read command to the memory device 310 (e.g., by the I/O interface 345 and the controller 320) and the memory device 310 may communicate data indicated by the read command to the host device 305 (e.g., by the controller 320 and the I/O interface 345). In another example, the host device 305 may communicate a write command to the memory device 310 and the memory device 310 may store the data indicated by the write command (e.g., within a memory array of the memory device 310). The memory device 310 may include memory arrays (e.g., as described with reference to FIG. 2) and may be a random access memory (RAM) device, a read only memory (ROM) device, a dynamic RAM (DRAM) device, a synchronous dynamic RAM (SDRAM) device, a ferroelectric RAM (FeRAM) device, a magnetic RAM (MRAM) device, a resistive RAM (RRAM) device, a flash memory device, a phase change memory (PCM) device, a self-selecting memory device, a chalcogenide memory device, or other type of memory device. The controller 320 may further be in electronic communication with the power management component 315.

The memory device 310 may utilize one or more supply voltages to power components within the memory device 310. In some cases, the memory device 310 may use supply voltages that are different than the input voltages 335. For example, the memory device 310 may be a three dimensional cross point memory device that includes components that operate based on receiving a voltage different than the input voltages 335. The power management component 315 may receive input voltages 335 and generate the supply voltages for the memory device 310. In some cases, it may be desirable to decrease an area of the substrate 340 that is being occupied by the power management component 315. That is, decreasing an area of the substrate 340 being occupied by the power management component 315 may allow additional components to be formed on the substrate 340 or allow for increased memory cells to be formed on the substrate 340. Here, an area of the substrate 340 occupied by the power management component 315 may be decreased by forming the first portion 325 of the power management component 315 on the memory device 310.

In one example, the entire power management component 315 may be formed within the memory device 310. Here, none of the power management component 315 may be formed on the substrate 340. In this example, the power management component 315 may include one or more capacitor charge pumps. The capacitor charge pumps may receive one or more input voltages 335-b and generate one or more supply voltages for the memory device 310. For example, the power management component 315 (e.g., including one or more charge pumps) may receive input voltages 335-b and output supply voltages. The input voltages 335-b and the supply voltages may be different voltage levels (e.g., some voltages may be higher than other voltages). In some cases, one or more of the input voltages 335-b or the supply voltages may be negative.

Although a power management component 315 formed entirely within the memory device 310 using capacitor charge pumps may decrease the area occupied by components formed on the substrate 340, the power management component 315 may consume a greater amount of power when compared to a power management component 315 with a second portion 330 formed on the substrate 340. That is, an internal charge pump (e.g., a capacitor charge pump formed within the memory device 310) may operate at a lower efficiency when compared to a power management component 315 that is formed at least partially on the substrate 340. Additionally, the capacitor charge pumps of the power management component 315 may decrease a thermal efficiency of the memory array 200 when compared to a power management component 315 that is formed at least partially on the substrate 340. In some cases, a power management component 315 formed entirely within the memory device 310 and including capacitor charge pumps may be formed on each memory die within the memory device 310.

Alternatively, a first portion 325 of the power management component 315 may be formed on the memory device 310 and a second portion 330 may be formed on the substrate 340. This may decrease an area of the substrate 340 occupied by the power management component 315 while still maintaining a similar level of power efficiency and thermal efficiency seen within a power management component 315 that is formed entirely on the substrate 340. The power management component 315 may receive the input voltages 335 and generate one or more supply voltages to power the memory device 310. Thus, the memory device 310 may receive one or more of the input voltages 335 as well as one or more supply voltages (e.g., generated by the power management component 315).

Figure 4:
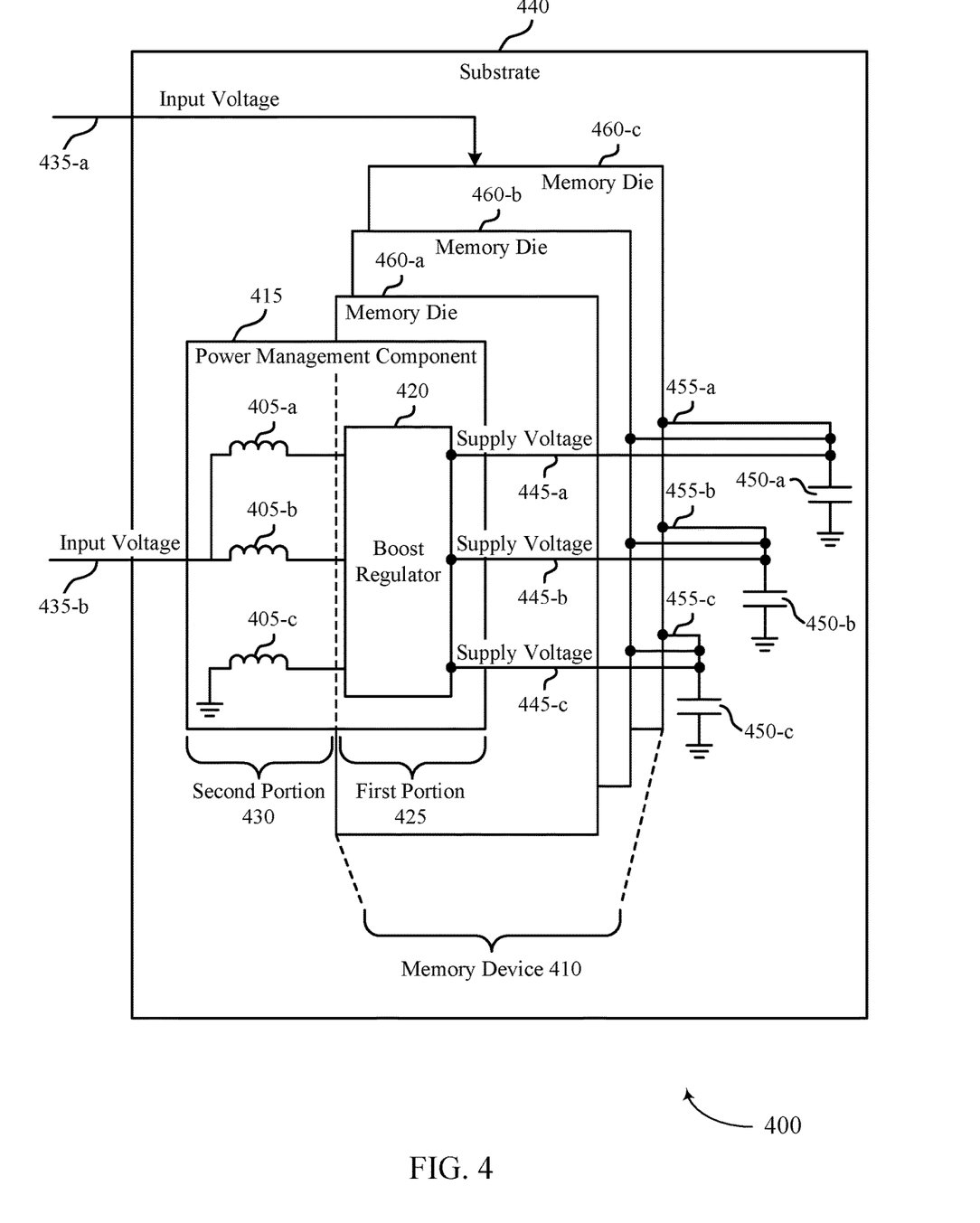

FIG. 4 illustrates an example of a memory system 400 that supports power management for a memory device in accordance with examples as disclosed herein. Memory system 400 may include aspects of memory systems or memory arrays as described with reference to FIGS. 1 through 3. For example, memory device 410 may include aspects of a memory device or memory array as described with reference to FIGS. 1 through 3; memory dies 460 may include aspects of a memory die as described with reference to FIG. 1; the power management component 415 may be an example of the power management component as described with reference to FIG. 3; and the substrate 440 may be an example of the substrate as described with reference to FIG. 3. The memory system 400 may further include input voltages 435, inductors 405, boost regulator 420, supply voltages 445, and capacitors 450.

The memory device 410 may be formed on the substrate 440. The memory device 410 may include one or more memory dies 460. Each memory die 460 may include one or more memory arrays configured to store data (e.g., associated with a host device). The memory device 410 may receive one or more input voltages 435-a from the substrate 440 and one or more supply voltages 445 from the power management component 415. Based on receiving the input voltages and supply voltages, the memory device 410 may perform operations such as read operations and write operations according to access commands (e.g., received from a host device). The power management component 415 may receive one or more input voltages 435-b and generate the one or more supply voltages 445-a. For example, the input voltages 435-b may include a first input voltage (e.g., a VCCQ voltage) and a second input voltage (e.g., a VCC voltage). Here, the supply voltages 445 may include a first supply voltage (e.g., a VHH voltage), a second supply voltage (e.g., a VPP voltage), and a third supply voltage (e.g., a VNN voltage). Each of the input voltages 435 and the supply voltages 445 may be different voltage levels. In some cases, one or more of the input voltages 435 or the supply voltages 445 may be negative.

The power management component 415 may have a first portion 425 that is formed on the memory device 410 and a second portion 430 that is formed on the substrate 440. The first portion 425 of the power management component 415 may be formed on the memory die 460-a. In some cases, each of the memory dies 460 may include a first portion 425 of the power management component 415. Alternatively, a single memory die 460-a may include the first portion 425 of the power management component 415. In such cases, the supply voltages generated by the power management component 415 may be supplied to each of the memory dies 460 by conductive paths 455 on the substrate 440. For example, supply voltage 445-a may be supplied to memory dies 460-b and 460-c by the conductive path 455-a. That is, conductive path 455-a may couple the supply voltage 445-a to memory die 460-b and 460-c. The conductive paths 455 may be coupled with a capacitor 450 and subsequently a ground voltage. For example, the conductive path 455-c may be charged to a voltage level corresponding to supply voltage 445-c and coupled with the capacitor 450-c. As a result, there may be a voltage drop corresponding to the supply voltage 445-c across the capacitor 450-c.

In some cases, each of the memory dies 460 may include the first portion 425. Here, a first portion 425 of the memory die 460-a may be connected. For example, the first portion 425 on memory die 460-a may be coupled with the second portion 430 and each of the other first portions 425 (e.g., on memory dies 460-b and 460-c) may also be coupled with the second portion 430. Alternatively, only a single memory die 460 may include the first portion 425. Here, a size of a memory array on the single memory die 460 may be smaller when compared to a memory array on a memory die 460 without the first portion 425 of the power management component 415. That is, the first portion 425 of the power management component 415 may occupy an area within the memory die 460-a (e.g., three millimeters) that may otherwise be occupied by the memory array. As a result, if the memory die 460-a includes the first portion 425 of the power management component 415, a quantity of memory cells on the memory die 460-a may be reduced when compared to a quantity of memory cells on memory dies 460-b and 460-b as memory dies 460-b and 460-c do not include the first portion 425 of the power management component 415. The quantity of memory cells within the memory device 410 (e.g., including the memory cells within each of the memory dies 460) is greater when a portion of the power management component 415 is formed on a single memory die 460 when compared to an example where the power management component 415 (e.g., including one or more capacitor charge pumps) is formed on each of the memory dies 460.

The first portion 425 of the power management component 415 may include one or more active components (e.g., components that function based on receiving power). For example, the first portion 425 of the power management component 415 may include a diode, a transistor or a switch, an oscillator, a comparator, an amplifier, a pulse width modulation circuit, and control circuitry. The second portion 430 of the power management component 415 may include one or more passive components such as resistors, capacitors, inductors, and transformers. In some cases, a formation process used to form memory device 410 may not be able to form certain passive components on the memory die 460. For example, the formation process used to form the memory device 410 may not be able to form inductors or may not be able to form inductors having inductance values large enough to be used by the power management component, such as the inductors 405 on the memory device 410. In another example, the formation process used to for the memory device 410 may be limited to forming capacitors with capacitive values that are less than a threshold value. As a result, capacitors with capacitive values greater than the threshold value may be formed on the substrate 440 within the second portion 430. In some other cases, capacitors with capacitive values greater than the threshold value may be formed on other portions of the substrate 440. For example, the capacitors 450 may be formed on the substrate 440 outside of the power management component 415.

The first portion 425 of the power management component 415 may include a boost regulator 420 that is configured to adjust the input voltages 435-b to generate the supply voltages 445. The second portion 430 of the power management component 415 may include one or more inductors 405. The inductors 405 and the boost regulator 420 may function as an inductor based boost regulator. The inductor based boost regulator may be more efficient when compared to a power management component 415 formed entirely on the memory device 410 (e.g., a power management component 415 including capacitor charge pumps). For example, a power management component 415 including an inductor based boost regulator may be approximately 80% efficient while a power management component 415 including capacitor charge pumps may be only between 8% and 33% efficient. Each of the supply voltages 445 may correspond to a unique inductor 405. For example, supply voltage 445-a may correspond to inductor 405-a, supply voltage 445-b may correspond to inductor 405-b, and supply voltage 445-c may correspond to inductor 405-c. Supply voltages 445-a and 445-b may be positive voltages (e.g., a same polarity as the input voltages 435-b) while the supply voltage 445-c may be a negative voltage (e.g., a different polarity as the input voltages 435-b).

Figure 5:
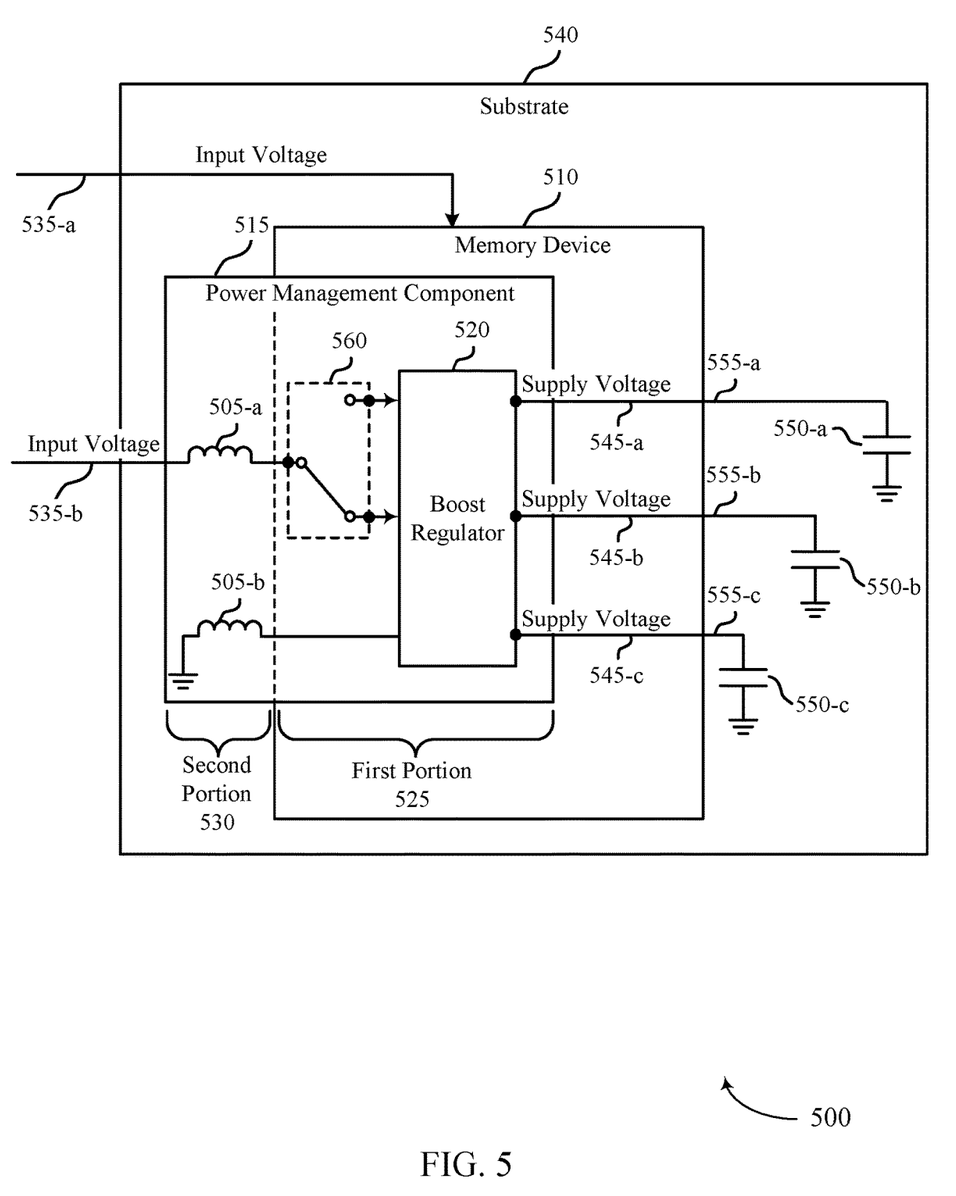

FIG. 5 illustrates an example of a memory system 500 that supports power management for a memory device in accordance with examples as disclosed herein. Memory system 500 may include aspects of memory systems or memory arrays as described with reference to FIGS. 1 through 4. For example, memory device 510 may include aspects of a memory device, memory array, or memory die as described with reference to FIGS. 1 through 4; the power management component 515 may be an example of the power management component as described with reference to FIGS. 3 and 4; inductor 505 and boost regulator 520 may be examples of the inductors and boost regulator as described with reference to FIG. 4, respectively; and the substrate 540 may be an example of the substrate as described with reference to FIGS. 3 and 4.

As described with reference to FIG. 4, a first portion of the power management component 515 may be formed on the memory device 510 rather than the substrate 540. As a result, the power management component 515 may occupy less area of the substrate 540 when compared to an example where the entire power management component 515 is formed and coupled with the substrate 540. The power management component 515 may receive one or more input voltages 535 and generate one or more supply voltages 545 that may be different than the input voltages 535. FIG. 4 illustrates an example where each supply voltage 545-a is associated with a unique inductor 505 within the second portion 530 of the power management component 515 (e.g., formed on and coupled with the substrate 540). Here, one inductor 505-a may be associated with more than one supply voltage 545. For example, inductor 505-a may be associated with supply voltages 545-a and 545-b while inductor 505-b may be associated with supply voltage 545-c.

The inductor 505-a may be selectively coupled to either a first circuit within the boost regulator 520 associated with the supply voltage 545-a or a second circuit within the boost regulator 520 associated with the supply voltage 545-b by the switching component 560 (e.g., a transistor). The switching component 560 may be in electronic communication with a controller (e.g., as described with reference to FIG. 1 and FIG. 3) that may cause the inductor 505-a to be coupled with the first circuit or the second circuit. For example, a controller may be formed on the memory device 510 and in electronic communication with the power management component 515 or the controller may be formed on the substrate 540 and in electronic communication with the power management component 515. As a result of the inductor selectively coupling to the first or second switching component, the supply voltages 545-a and 545-b may be generated for different time durations. For example, the supply voltage 545-a may be output for a first time duration while the inductor 505-a is coupled with the first circuit. During the first time duration, the supply voltage 545-b may not be output. The supply voltage 545-b may be output during a second time duration while the inductor 505-a is coupled with the second circuit. During the second time duration, the supply voltage 545-a may not be output. The first and second time durations may be equal. Alternatively, the first and second time durations may be different. For example, the second time duration may be larger than the first time duration. Here, the supply voltage 545-b may be generated for more time than the supply voltage 545-a.

Decreasing a quantity of passive components (e.g., inductors 505) within the second portion 530 of the power management component 515 may decrease an area of the second portion 530 of the power management component 515. As a result, the area of the substrate 540 occupied by the second portion 530 of the power management component 515 may be further decreased.

Figure 6:
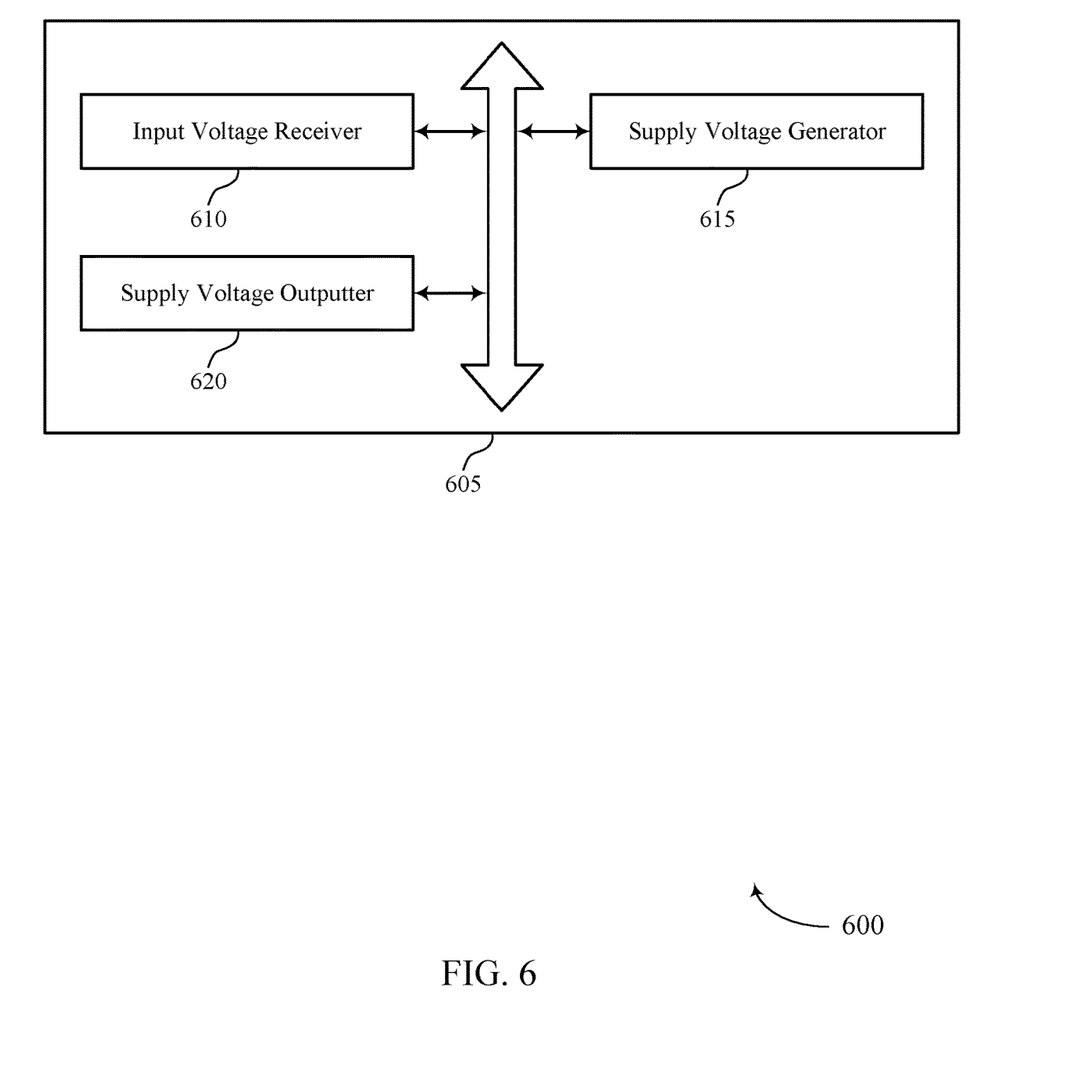
FIG. 6 shows a block diagram of a memory system that supports power management for a memory device in accordance with examples as disclosed herein.

FIG. 6 shows a block diagram 600 of a memory system 605 that supports power management for a memory device in accordance with examples as disclosed herein. The memory system 605 may be an example of aspects of a memory system as described with reference to FIGS. 1, 3, 4, and 5. The memory system 605 may include an input voltage receiver 610, a supply voltage generator 615, and a supply voltage outputter 620. Each of these modules may communicate, directly or indirectly, with one another (e.g., via one or more buses).

The input voltage receiver 610 may receive one or more input voltages associated with a memory system.

The supply voltage generator 615 may generate, by a power management component, one or more supply voltages for operating a memory device based on receiving the one or more input voltages, a first portion of the power management component integrated with a memory die of the memory device and a second portion of the power management component coupled with a substrate of the memory system. In some cases, the first portion includes a diode, a transistor, an oscillator, a comparator, an amplifier, a pulse width modulation circuit, a pulse frequency modulation circuit, or any combination thereof. Additionally or alternatively, the second portion may include one or more inductors and one or more capacitors incapable of being formed on the memory die of the memory device.

In some examples, the supply voltage generator 615 may couple, for a first duration, an inductor of the second portion with a first circuit of the first portion for generating a first supply voltage of the one or more supply voltages. The supply voltage generator 615 may couple, for a second duration, the inductor with a second circuit of the first portion for generating a second supply voltage of the one or more supply voltages. In some cases, the first and second durations may be the same. Alternatively, the second duration may be different than the first duration. In some instances, generating the one or more supply voltages is based on coupling the inductor with the first circuit and the second circuit. In some cases, the supply voltage generator 615 may activate one or more switching components to selectively couple an inductor of the second portion with a first circuit of the first portion for generating a first supply voltage of the one or more supply voltages and a second circuit of the first portion for generating a second supply voltage of the one or more supply voltages. Here, generating the one or more supply voltages may be based on activating the one or more switching components. In some cases, the inductor is shared between the first circuit and the second circuit and is operable to generate the first supply voltage and the second supply voltage.

The supply voltage outputter 620 may output the one or more supply voltages to a set of memory dies of the memory device, the set of memory dies including the memory die.

Figure 7:
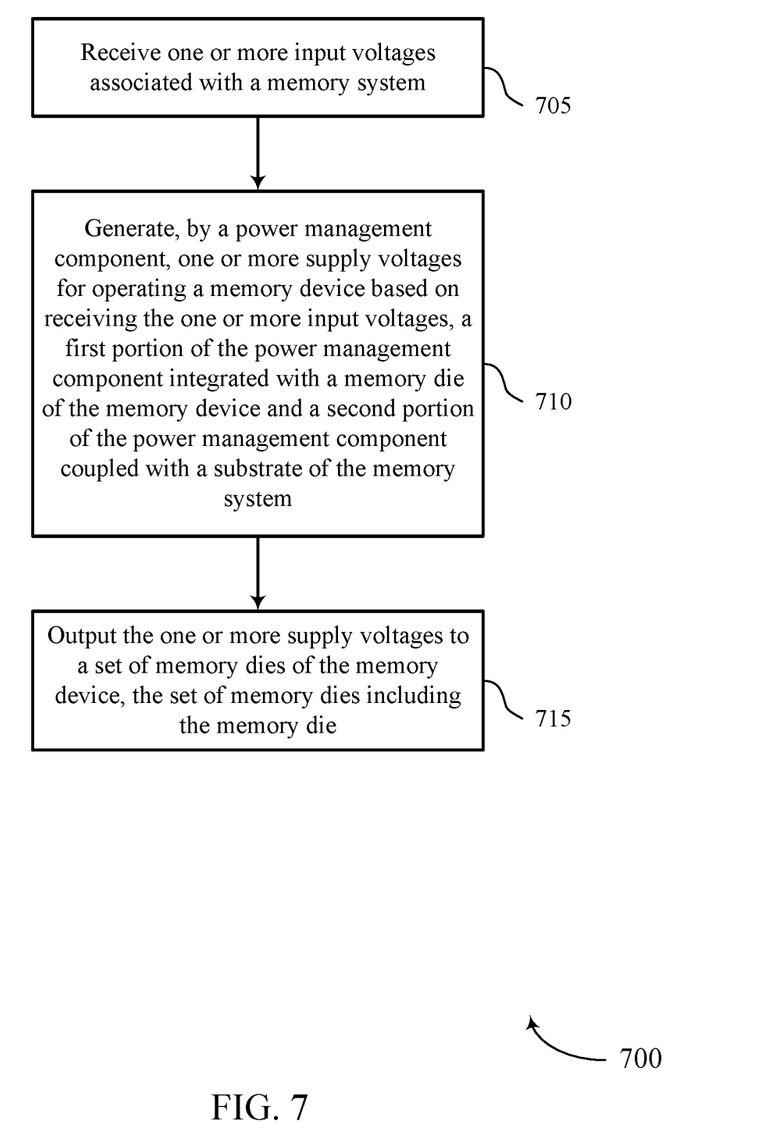
FIG. 7 shows a flowchart illustrating a method or methods that support power management for a memory device in accordance with examples as disclosed herein.

FIG. 7 shows a flowchart illustrating a method or methods 700 that supports power management for a memory device in accordance with examples as disclosed herein. The operations of method 700 may be implemented by a memory system or its components as described herein. For example, the operations of method 700 may be performed by a memory system as described with reference to FIG. 6. In some examples, a memory system may execute a set of instructions to control the functional elements of the memory system to perform the described functions. Additionally or alternatively, a memory system may perform aspects of the described functions using special-purpose hardware.

At 705, the memory system may receive one or more input voltages associated with a memory system. The operations of 705 may be performed according to the methods described herein. In some examples, aspects of the operations of 705 may be performed by an input voltage receiver as described with reference to FIG. 6.

At 710, the memory system may generate, by a power management component, one or more supply voltages for operating a memory device based on receiving the one or more input voltages, a first portion of the power management component integrated with a memory die of the memory device and a second portion of the power management component coupled with a substrate of the memory system. The operations of 710 may be performed according to the methods described herein. In some examples, aspects of the operations of 710 may be performed by a supply voltage generator as described with reference to FIG. 6.

At 715, the memory system may output the one or more supply voltages to a set of memory dies of the memory device, the set of memory dies including the memory die. The operations of 715 may be performed according to the methods described herein. In some examples, aspects of the operations of 715 may be performed by a supply voltage outputter as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving one or more input voltages associated with a memory system, generating, by a power management component, one or more supply voltages for operating a memory device based on receiving the one or more input voltages, a first portion of the power management component integrated with a memory die of the memory device and a second portion of the power management component coupled with a substrate of the memory system, and outputting the one or more supply voltages to a set of memory dies of the memory device, the set of memory dies including the memory die.

Some examples of the method 700 and the apparatus described herein may further include operations, features, means, or instructions for coupling, for a first duration, an inductor of the second portion with a first circuit of the first portion for generating a first supply voltage of the one or more supply voltages, and coupling, for a second duration, the inductor with a second circuit of the first portion for generating a second supply voltage of the one or more supply voltages. Here, generating the one or more supply voltages may be based on coupling the inductor with the first circuit and the second circuit. In some cases, the first and second durations may be the same. Alternatively, the second duration may be different than the first duration. In some cases of the method 700 and the apparatus described herein, the inductor may be shared between the first circuit and the second circuit and may be operable to generate the first supply voltage and the second supply voltage.

Some instances of the method 700 and the apparatus described herein may further include operations, features, means, or instructions for activating one or more switching components to selectively couple an inductor of the second portion with a first circuit of the first portion for generating a first supply voltage of the one or more supply voltages and a second circuit of the first portion for generating a second supply voltage of the one or more supply voltages. Here, generating the one or more supply voltages may be based on activating the one or more switching components. In some examples of the method 700 and the apparatus described herein, the first portion includes a diode, a transistor, an oscillator, a comparator, an amplifier, a pulse width modulation circuit, a pulse frequency modulation circuit, or any combination thereof, and the second portion includes one or more inductors and one or more capacitors incapable of being formed on the memory die of the memory device.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a substrate, an I/O interface coupled with the substrate and for communicating with a host device, a memory device coupled with the substrate and for storing data associated with the host device, and a power management component for providing one or more supply voltages to the memory device based on receiving one or more input voltages associated with the substrate. The power management component may include a first portion integrated with the memory device and a second portion coupled with the substrate.

In some examples, the memory device includes a set of memory dies and the first portion of the power management component may be integrated with a single memory die of the set of memory dies. In some cases, the memory device includes one or more conductive paths to route the one or more supply voltages from the power management component integrated with the single memory die to one or more other memory dies of the set of memory dies. In some instances, the single memory die includes the first portion of the power management component and an array of memory cells for storing the data associated with the host device.

In some examples, the first portion includes components formed on a memory die of the memory device, and the second portion includes components formed on the substrate. In some cases, the first portion includes control circuitry for the power management component, and the second portion includes one or more passive components for the power management component. In some instances, the first portion includes a diode, a transistor, an oscillator, a comparator, an amplifier, a pulse width modulation circuit, a pulse frequency modulation circuit, or any combination thereof, and the second portion includes one or more inductors and one or more capacitors incapable of being formed on a memory die of the memory device.

In some examples, the power management component includes an inductor-based boost regulator to generate the one or more supply voltages different than the one or more input voltages of the power management component. In some instances, an inductor of the second portion may be associated with each unique supply voltage generated by the power management component. In some cases, an inductor of the second portion may be associated with two or more unique supply voltages generated by the power management component and one or more switching components may be operable to selectively couple the inductor with one of the two or more unique supply voltages.

In some examples, the one or more input voltages may be for powering components coupled with the substrate, and the one or more supply voltages may be for powering components of the memory device, where the one or more supply voltages may be different than the one or more input voltages. Some instances of the apparatus may include a control circuit coupled with the substrate and operable to issue commands to the I/O interface or the memory device. In some cases, the memory device includes one or more memory cells including chalcogenide-based storage elements. In some examples, the apparatus includes a UFS apparatus.

An apparatus is described. The apparatus may include a memory device for storing data, a power management component a first portion of the power management component integrated with a memory die of the memory device and a second portion of the power management component coupled with a substrate, and a controller operable to cause the power management component to receive one or more input voltages, generate one or more supply voltages for operating the memory device based on receiving the one or more input voltages, and output the one or more supply voltages to a set of memory dies of the memory device, the set of memory dies including the memory die.

In some examples, the controller may be further operable to couple, for a first duration, an inductor of the second portion with a first circuit of the first portion for generating a first supply voltage of the one or more supply voltages, and couple, for a second duration, the inductor with a second circuit of the first portion for generating a second supply voltage of the one or more supply voltages. Here, generating the one or more supply voltages may be based on coupling the inductor with the first circuit and the second circuit. In some cases, the first and second durations may be the same. Alternatively, the second duration may be different than the first duration.

In some cases, the inductor may be shared between the first circuit and the second circuit and may be operable to generate the first supply voltage and the second supply voltage. In some instances, the controller may be further operable to activate one or more switching components to selectively couple an inductor of the second portion with a first circuit of the first portion for generating a first supply voltage of the one or more supply voltages and a second circuit of the first portion for generating a second supply voltage of the one or more supply voltages. Here, generating the one or more supply voltages may be based on activating the one or more switching components. In some examples, the controller may be part of the memory device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a substrate;
an input/output (I/O) interface coupled with the substrate and for communicating with a host device;
a memory device coupled with the substrate and for storing data associated with the host device; and
a power management component for providing one or more supply voltages to the memory device based at least in part on receiving one or more input voltages associated with the substrate, wherein a first portion of the power management component is integrated with the memory device and a second portion of the power management component is coupled with the first portion of the power management component and the substrate.

2. The apparatus of claim 1, wherein the first portion of the power management component occupies a same area of the substrate as at least a portion of the memory device.

3. The apparatus of claim 1, wherein the second portion of the power management component occupies a different area of the substrate than the memory device.

4. The apparatus of claim 1, wherein:
the memory device comprises a plurality of memory dies; and
the first portion of the power management component is integrated with a single memory die of the plurality of memory dies.

5. The apparatus of claim 4, wherein the memory device further comprises one or more conductive paths to route the one or more supply voltages from the power management component integrated with the single memory die to one or more other memory dies of the plurality of memory dies.

6. The apparatus of claim 4, wherein the single memory die comprises the first portion of the power management component and an array of memory cells for storing the data associated with the host device.

7. The apparatus of claim 1, wherein:
the first portion of the power management component comprises first components formed on a memory die of the memory device; and
the second portion of the power management component comprises second components formed on the substrate.

8. The apparatus of claim 7, wherein one or more of the first components formed on the memory die are coupled with one or more of the second components formed on the substrate.

9. The apparatus of claim 1, wherein:
the first portion of the power management component comprises control circuitry for the power management component; and
the second portion of the power management component comprises one or more passive components for the power management component.

10. The apparatus of claim 9, wherein:
the control circuitry of the first portion of the power management component is coupled with the one or more passive components of the second portion of the power management component.

11. The apparatus of claim 9, wherein:
the first portion of the power management component comprises a diode, a transistor, an oscillator, a comparator, an amplifier, a pulse width modulation circuit, a pulse frequency modulation circuit, or any combination thereof; and
the second portion of the power management component comprises one or more inductors and one or more capacitors incapable of being formed on a memory die of the memory device.

12. The apparatus of claim 1, wherein:
the power management component comprises an inductor-based boost regulator to generate the one or more supply voltages different than the one or more input voltages of the power management component; and
the inductor-based boost regulator comprises one or more components within the first portion of the power management component and one or more components within the second portion of the power management component.

13. The apparatus of claim 1, wherein:
the second portion of the power management component comprises one or more inductors; and
each of the one or more inductors are associated with a unique supply voltage generated by the power management component.

14. The apparatus of claim 1, wherein:
the second portion of the power management component comprises an inductor and one or more switching components;
the inductor is associated with two or more unique supply voltages generated by the power management component; and
the one or more switching components are operable to selectively couple the inductor with one of the two or more unique supply voltages.

15. The apparatus of claim 1, wherein:
the one or more input voltages are for powering components coupled with the substrate;
the one or more supply voltages are for powering components of the memory device; and
the one or more supply voltages are different than the one or more input voltages.

16. A method, comprising:
receiving one or more input voltages associated with a memory system;
generating, by a power management component, one or more supply voltages for operating a memory device based at least in part on receiving the one or more input voltages, wherein a first portion of the power management component is integrated with a memory die of the memory device and a second portion of the power management component is coupled with the first portion of the power management component and a substrate of the memory system; and
outputting the one or more supply voltages from the power management component to a plurality of memory dies of the memory device, the plurality of memory dies comprising the memory die.

17. The method of claim 16, wherein the first portion of the power management component occupies a same area of the substrate as at least a portion of memory die of the memory device.

18. The method of claim 16, wherein the second portion of the power management component occupies a different area of the substrate than the memory die of the memory device.

19. The method of claim 16, wherein:
the first portion of the power management component comprises a diode, a transistor, an oscillator, a comparator, an amplifier, a pulse width modulation circuit, a pulse frequency modulation circuit, or any combination thereof; and
the second portion of the power management component comprises one or more inductors and one or more capacitors incapable of being formed on the memory die of the memory device.

20. An apparatus, comprising:
a memory device for storing data, the memory device comprising a plurality of memory dies including at least a first memory die;
a power management component, wherein a first portion of the power management component is integrated with the first memory die of the memory device and a second portion of the power management component is coupled with the first portion of the power management component and a substrate; and
a controller operable to cause the power management component to:
receive one or more input voltages;
generate one or more supply voltages for operating the memory device based at least in part on receiving the one or more input voltages; and
output the one or more supply voltages to the plurality of memory dies.

* * * * *